Patented Dec. 7, 1926.

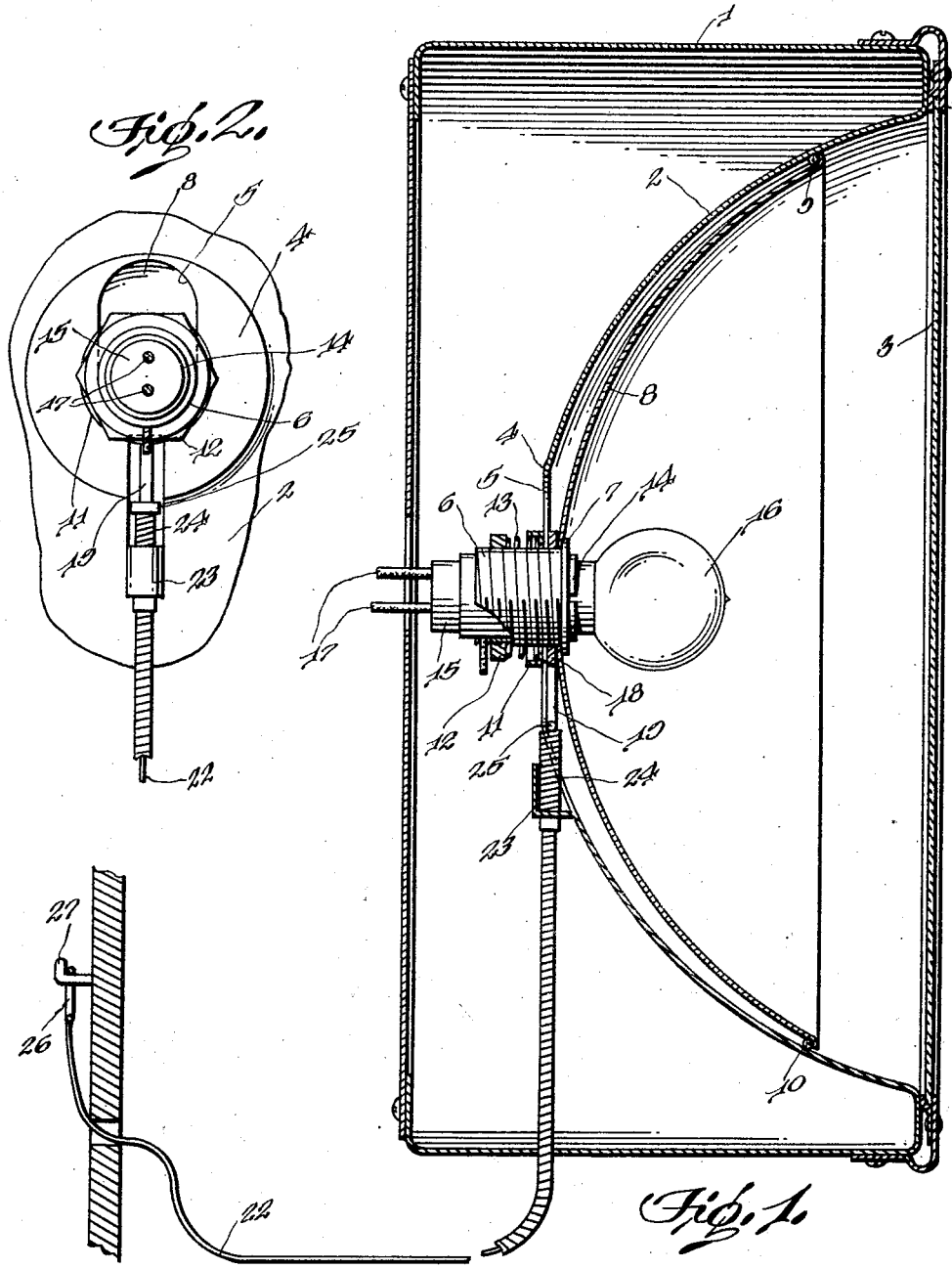

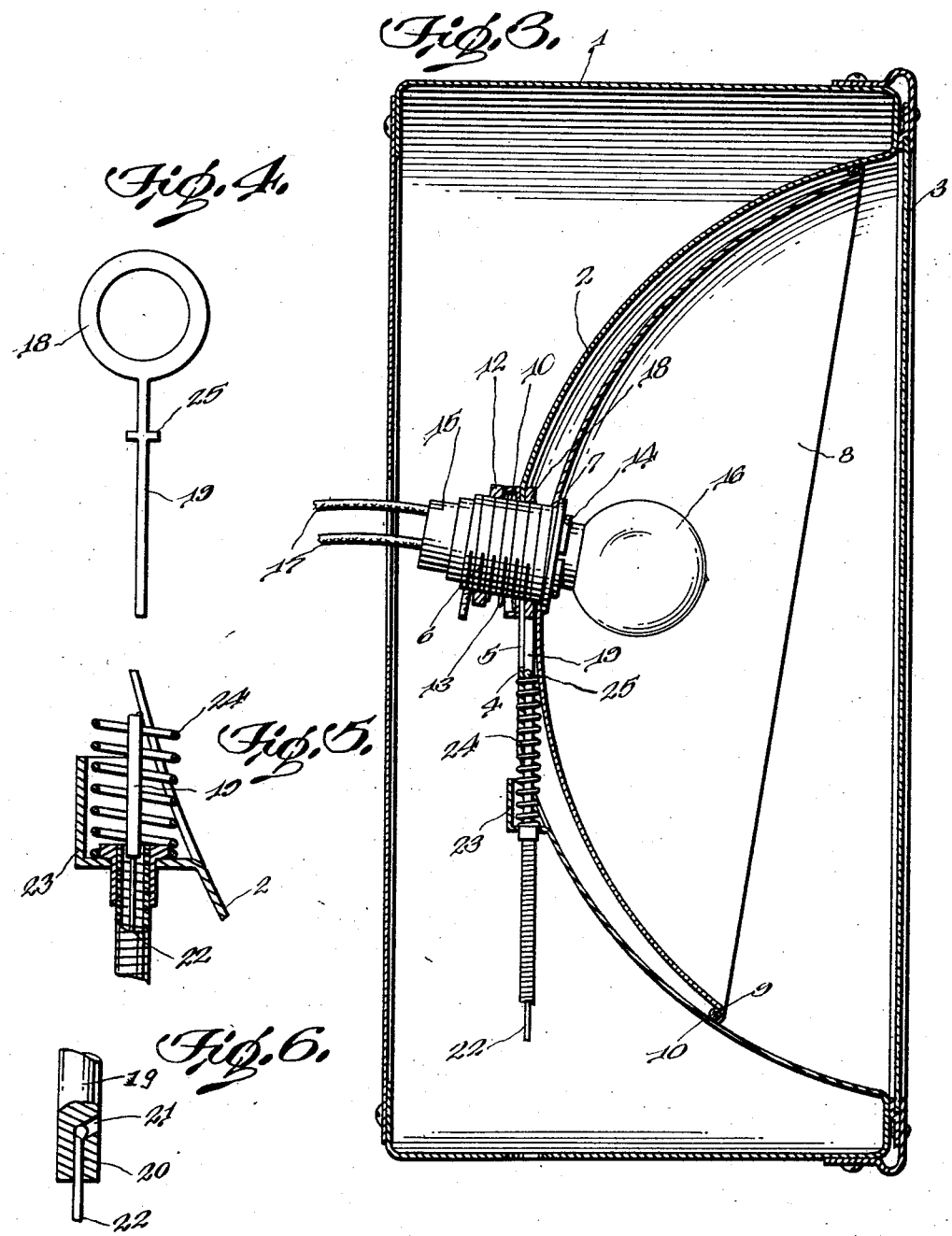

1,610,086

UNITED STATES PATENT OFFICE.

JOHN P. GOMMELS, OF MONMOUTH, ILLINOIS.

REFLECTOR.

Application filed November 22, 1924. Serial No. 751,608.

This invention relates to new and useful improvements in headlights for motor vehicles and more particularly to means for adjustably mounting the parabolic reflector whereby the rays of light may be quickly and readily thrown toward the surface over which the vehicle is travelling when approaching another vehicle travelling in the opposite direction. The main object of my invention is the provision of a headlight of the above character wherein novel means is incorporated for movably mounting the parabolic reflector whereby the same is normally positioned to reflect the rays of light upon a substantially horizontal plane in front of the vehicle and upon approaching another vehicle coming from the opposite direction the parabolic reflector may be quickly and readily moved for directing the rays of light downwardly on to the surface over which the vehicle is travelling, in order to eliminate the reflection of rays in the eyes of the approaching driver.

Another object of my invention is the provision of novel means for operating a movable parabolic reflector whereby the same can be quickly and readily operated from the driver's seat of a motor vehicle for adjusting the reflective rays of light.

With the above and other objects in view, the invention consists in the novel features of construction, the combination and arrangement of parts hereinafter more fully set forth, pointed out in the claims and shown in the accompanying drawings, in which:

Fig. 1 is a vertical section taken through a headlight illustrating my improved device applied thereto, Fig. 2 is a detail rear elevation, Fig. 3 is a view similar to Fig. 1 showing the adjustable parabolic reflector in an inclined position, Fig. 4 is an elevation of the movable ring connected to the operating means, Fig. 5 is a detail longitudinal section illustrating the manner in which the tension spring is supported, and Fig. 6 is a detail section illustrating the manner in which the operating member is attached to the rod on the movable ring.

In the drawings wherein I have illustrated one construction of my device, the numeral 1 indicates the casing of a motor vehicle headlight having arranged therein a stationary curved reflecting plate 2 and the casing further supports a lens 3 arranged in front of the curved reflecting plate.

The inner portion of this curved reflecting plate 2 is provided with a flat face 4 having a longitudinal slot 5 therein. Extending through the slot 5 is an externally threaded sleeve 6 having upon one end a rim 7 which forms a stop as illustrated in Figures 1 and 3. Mounted upon the sleeve 6 and arranged adjacent the rim 7 is a movable parabolic reflector 8 having its annular edge curved inwardly as at 9 to form an annular channel in which a rim 10 of felt or the like is arranged for permitting a smooth operation of the parabolic reflector 8 in its movement.

The sleeve 6 extends through the slot 5 and mounted upon the sleeve is a cup washer 11 which snugly fits against the flat face 4 and threaded upon the sleeve 6 in spaced relation with the washer 11 is a retaining nut 12. In order to yieldably retain the washer 11 in contact with the face 4, a coil spring 13 is positioned between the nut 12 and the washer 11 as shown in Figures 1 and 3 so that its tension will force the washer 11 into contact with the face 4.

Mounted within the sleeve 6 is an inner sleeve 14 in which the usual contact plug 15 is mounted for connection with the double filament bulb 16. This contact plug 15 has the usual circuit wires 17 which may be connected with the usual lighting system of a motor vehicle.

Mounted upon the sleeve 6 is a ring 18 having a stem 19 projecting therefrom, the ring being mounted upon the sleeve 6 whereby a movement on the part of the ring 18 will impart movement to the sleeve 6 and impart a rocking movement to the parabolic reflector 8. The stem 19 on the ring 18 has its outer end provided with a central bore 20 and an oblique bore 21 extending inwardly from the side of the stem and communicating with the inner end of the bore 20. A connecting wire 22 has one end inserted in the bore 20 and in order to connect the same with the stem 19 a drop of solder is inserted in the bore 21 and engages with the inner end of the wire 22 in its molten condition so that when the same hardens it will adhere to the inner end of the wire 22 and connect the same to the stem 19.

An angular bracket 23 is stamped out from the curved reflector 2 through which the lower end of the stem 19 extends and mounted upon the stem is a coil spring 24, one end of which rests upon the bracket 23 and the other end engages beneath the laterally projecting lugs 25 formed upon the stem 19 beneath the ring 18. From this construction, it will be apparent that when the wire 22 is pulled downwardly with respect to the bracket 23 the stem 19 will move downwardly whereby to move the sleeve 6 and bulb 16 as well as the parabolic reflector 8 to a horizontal position, thus reflecting the rays directly in advance of the vehicle in substantially a horizontal plane and at the same time places the spring 24 under tension so that when the wire 22 is released, the tension of the spring 24 will move the sleeve 6 to an inclined position as shown in Figure 3, thus placing the spring 13 under a slight tension as illustrated in Figure 3 so that when the device is again moved to a substantially inclined horizontal position the spring 13 will assist in causing the device to assume this position.

The wire 22 has its end remote from the end attached to the stem 19 provided with a ring or other suitable fastening member as at 26 and may be attached to any suitable retaining member 27 on the dash of the vehicle in close proximity to the driver's seat so that when the vehicle is approaching another vehicle coming from the opposite direction, the driver will grasp the member 26 and release the same from the member 27 so that the tension of the spring 24 will be released in order to rock the parabolic reflector 8 within the reflector 2 casing the same to assume the inclined position shown in Fig. 3 which will reflect the rays from the bulb 16 on to the surface over which the vehicle is travelling so that the rays will not interfere with the driver of an approaching vehicle and after the approaching vehicle has passed, the driver will exert a pull upon the wire 22 to return the member 26 to its engagement with the member 27, thus again placing the spring 24 under tension and moving the parabolic reflector 8 to its horizontal position as shown in Figure 1. It will also be apparent that when the parabolic reflector 8 is moved to an inclined position as shown in Figure 3, the spring 13 will be placed under tension so that when the ring 18 is pulled downwardly through its connection with the wire 22, the spring 13 will assist causing the parabolic reflector 8 to assume its horizontal position, the felt bearing ring riding over the inner surface of the reflector 2 will guide the parabolic reflector in its proper movements.

It will be apparent from the foregoing that I have provided an effective device of the above character wherein the parabolic reflector of the headlight may always be maintained in a horizontal position and quickly and readily moved to an inclined position during the approach of another vehicle from the opposite direction.

While I have shown and described the preferred embodiment of my invention, it will be understood that various changes and alterations may be made without departing from the spirit of the invention or the scope of the appended claims.

Having thus described my invention, what I claim is:

1. A headlight of the class described including a curved reflector plate having a flattened portion provided with a slot, a parabolic reflector confined within the reflector plate, means providing a connection between the parabolic reflector and the reflector plate, said means being adapted to move longitudinally of the slot to adjust the parabolic reflector at an inclination to the reflector plate, means disposed on opposite sides of the flattened portion and carried by the connecting means for guiding the connecting means in said movement, means for moving said connecting means along the length of the slot to move said parabolic reflector, the peripheral edge of said parabolic reflector having bearing relation with adjacent surface of the reflector plate for guiding the parabolic reflector to and from an inclined position with respect to the reflector plate, and resilient means for holding the guiding means in guiding position on opposite sides of the flattened portion.

2. A headlight of the class described including a reflector plate having a slot formed therein, a parabolic reflector, means providing a sliding connection between the reflector plate and the parabolic reflector, said connecting means being adapted for movement along the length of the slot, operating means associated with the connecting means for moving the connecting means along the length of the slot, said operating means including a stem having a lateral projection formed thereon, a bracket carried by the reflector plate providing a bearing for the stem, a resilient member embracing the stem and disposed between the lateral projection and the bracket, in combination with an operating member for operating the stem to compress the resilient member to permit automatic adjustment of the parabolic reflector at an inclination to the reflector plate by expansion of the resilient member upon release of the operating member.

3. A headlight including a reflector plate having a central flattened portion provided with a slot, a lighting element socket supporting sleeve inserted through the slot for movement therein, a retaining member carried by the sleeve and engaging on one side of the flattened portion, a retaining member carried by the sleeve and engaging the other side of the flattened portion, a member threaded upon the sleeve outwardly of the second mentioned retaining member, a yieldable member embracing the sleeve and disposed between the threaded member and the second mentioned retaining member, a parabolic reflector carried by the sleeve and including an outwardly turned peripheral edge, a pliable member carried by the outwardly turned edge and engaging the inner surface of the reflector plate, and means for moving said sleeve to adjust the parabolic reflector with respect to the reflector plate, said pliable member serving to prevent scratching of the reflecting surface of the reflector plate during movement of the parabolic reflector.

4. A headlight including a reflector plate having a central flattened portion provided with a slot, a lighting element socket supporting sleeve inserted through the slot for movement therein, a retaining member carried by the sleeve and engaging on one side of the flattened portion, a retaining member carried by the sleeve and engaging the other side of the flattened portion, a member threaded upon the sleeve outwardly of the second mentioned retaining member, a yieldable member embracing the sleeve and disposed between the threaded member and the second mentioned retaining member, a parabolic reflector carried by the sleeve and including an outwardly turned peripheral edge, a pliable member carried by the outwardly turned edge and engaging the inner surfaces of the reflector plate, and means for moving said sleeve to adjust the parabolic reflector with respect to the reflector plate, said means including a ring member operatively embracing the sleeve, a stem depending from the ring member and including a lateral projection formed thereon, a bracket carried by the reflector plate providing a bearing for the stem, a resilient member embracing the stem and disposed between the lateral projection and the bracket, in combination with an operating member for operating the stem to compress the resilient member to permit automatic adjustment of the parabolic reflector at an inclination to the reflector plate by expansion of the resilient member upon release of the operating member.

In testimony whereof I affix my signature.

JOHN P. GOMMELS.